US007002772B2

(12) United States Patent
Yardy

(10) Patent No.: US 7,002,772 B2
(45) Date of Patent: Feb. 21, 2006

(54) GRIPPER MECHANISM FOR TAPE CARTRIDGES

(75) Inventor: Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 10/188,670

(22) Filed: Jul. 3, 2002

(65) Prior Publication Data

US 2004/0004784 A1 Jan. 8, 2004

(51) Int. Cl.
*G11B 17/22* (2006.01)
(52) U.S. Cl. .......................................... 360/92
(58) Field of Classification Search ................ 414/268, 414/269, 270, 277, 280; 360/92; 369/30.43, 369/30.55
See application file for complete search history.

(56) References Cited

U.S. PATENT DOCUMENTS

| 4,742,405 | A |   | 5/1988  | Teranishi             |
|-----------|---|---|---------|-----------------------|
| 5,341,258 | A | * | 8/1994  | Chalmers et al. ....... 360/92 |
| 5,363,258 | A | * | 11/1994 | Coles et al. ........... 360/92 |
| 5,588,796 | A | * | 12/1996 | Ricco et al. ........... 414/741 |
| 5,700,125 | A | * | 12/1997 | Falace et al. .......... 414/276 |
| 5,848,872 | A | * | 12/1998 | Manes et al. .......... 414/753.1 |
| 6,549,358 | B1| * | 4/2003  | Billy et al. ............ 360/69 |

FOREIGN PATENT DOCUMENTS

| EP | 500385 A2 | * | 8/1992 |
| JP | 02081352 A | * | 3/1990 |

OTHER PUBLICATIONS

C.H. Dang, "Rotary Input/Output Station with Gravity Assistance for Data Storage Libraries", IBM Technical Disclosure Bulletin, vol. 38, No. 01, Jan. 1995, pp. 223-224.

* cited by examiner

*Primary Examiner*—William J Klimowicz
(74) *Attorney, Agent, or Firm*—Scully, Scott, Murphy & Presser; John Kennel, Esq.

(57) ABSTRACT

A gripper mechanism for manipulating tape cartridges in a tape library system, the tape library system having a plurality of storage cells for removably storing a tape cartridge therein, each tape cartridge formed with engageable side slots located at side portions of the cartridge designed for retaining a respective cartridge in a respective storage cell and including a downward sloped lower front edge portion. The gripper mechanism includes a pair of gripping fingers actuated for respectively engaging a respective side slot located at a side portion of the cartridge for manipulating the cartridge, and including support members extending outward from the gripper mechanism at a lower portion thereof for engagement with the sloped lower front edge portion of the cartridge.

18 Claims, 5 Drawing Sheets

GRIPPER MECHANISM FOR TAPE CARTRIDGES

BACKGROUND OF THE INVENTION

1. Field of the Invention

The present invention relates generally to the field of media storage systems such as removable tape drive systems and, more particularly, a novel storage cell and gripping mechanism for rendering existing tape cartridges compatible with newer tape library systems and devices.

2. Discussion of the Prior Art

Linear Tape-Open or "LTO" technology is a relatively new generation of tape media storage products designed to surpass previous tape capacity and performance benchmarks. LTO technology is the first tape storage architecture to offer compatibility of midrange tape storage drives and media from multiple manufacturers. That is, it is an open industry-standard format for digital tape.

One tape library system for receiving tapes cartridges of the LTO format is available from International Business Machines Corporation and referred to as the IBM 3584.

Older tape library systems accommodating digital linear tape "DLT" cartridges, or standard 3590 tape cartridges are also available from IBM and include the 3494 library for receiving/storing the IBM 3590 style cartridge. FIGS. 1(a) and 1(b) illustrate respective front perspective and underside perspective views of the IBM 3590 style cartridge 20. As shown in FIGS. 1(a) and 1(b), the IBM 3590 is a cartridge includes two engagement slots 22a, 22b formed in respective sides 16a, 16b of the cartridge 20 which are engageable by respective catch mechanisms provided in a 3494 library cell for engaging the cartridge when stored therein. As shown in FIGS. 1(a) and 1(b), the IBM 3590 style cartridge 20 additionally includes an upper straight front edge portion 29 merging into a lower ramped or sloped edge portion 30 that merges into the bottom or underside 28 of the cartridge 20. Additionally formed as part of the IBM 3590 cartridge design is a recessed portion 35 formed at the center of the front ramped portion 30 of the cartridge. Older gripping mechanisms for manipulating 3590 cartridges for storage in a 3494 library cell (not shown) relied on friction grip on the top and bottom portion of the cartridge. Consequently, older gripping mechanisms were complex and tended to be heavy and more costly to implement.

FIG. 2 illustrates a standard storage cell 10, for example, implemented in an IBM 3494 tape library for receiving and storing the IBM 3590 style cartridge 20. As shown in FIG. 2, the storage cell includes a housing having at least a supporting bottom portion 11, left side 12 and right side portions. The design of the cell 10 used for the IBM 3590 tape cartridges in a 3494 library utilizes two sprung catches 15a, 15b in both sides 12, 13 of the cell to respectively locate and engage each of two slots 22a, 22b formed in respective sides of the cartridge. As mentioned older gripping mechanisms for storing 3590 cartridges in the 3494 library cell relied on friction grip on the top and bottom portion of the cartridge.

The current tape cartridge gripper mechanism in the IBM 3584 tape library is designed to handle both LTO or DLT tape cartridges. However, the very simple, low cost, high reliability gripper used in the IBM 3584 tape library system includes side engagement means designed to grip cartridges by the slots formed in their sides. As the standard storage cell 10 of FIG. 2 is designed to engage the respective engagement slots of the 3590 tape cartridge, the slots are rendered unavailable for use by the gripper mechanism provided for the IBM 3584 tape library. Thus, to enable the 3590 style tape cartridge to be used in the IBM 3584 library, a gripper and cell combination enabled to store and retrieve the 3590 style tape cartridge needs to be developed.

SUMMARY OF THE INVENTION

It is thus an object of the present invention to resolve these two conflicting conditions by designing a tape cartridge cell that enables a gripper mechanism of the IBM 3584 tape library system to retrieve and insert the 3590 style tape cartridge in the IBM 3584 library storage cell for removeable storage thereof.

It is a further object of the present invention to provide a tape cartridge cell that includes a lip on a leading edge thereof that functions to retain the cartridge in the cell by engaging the recessed section in the center of the cartridge, thus leaving the slots in the sides of the cartridge available for use by a gripper mechanism.

Thus, according to the invention, in a tape library system having one or more storage cells for removably storing tape cartridges, wherein each tape cartridge is formed with engageable side slots located at side portions of the cartridge designed for retaining a respective cartridge in a respective storage cell and includes a downward sloped lower front edge portion, there is provided an extensible gripper mechanism having a pair of gripping fingers actuated for respectively engaging a respective side slot located at a side portion of the cartridge for manipulating the cartridge, and including support members extending outward from the gripper mechanism at a lower portion thereof for engagement with the sloped lower front edge portion, wherein the cartridge is lifted by the support members and grasped by the gripper fingers for storage and retrieval operations.

Preferably, for a cartridge retrieval operation, the support members wedge the cartridge in an upward direction over the upwardly extending lip portion while in the cell prior to grasping the cartridge with the gripper fingers.

Further, for cartridge storage operations when the gripping mechanism is grasping the tape cartridge at the respective side slots, the gripper mechanism is caused to be extended toward the storage cell for inserting the cartridge in the cell, and the cartridge is lowered behind the upwardly extending lip portion prior to releasing the gripper fingers.

Advantageously, the gripper mechanism and modified storage cell is implemented for the IBM 3584 tape cartridge library storage system for storing LTO and DLT type tape cartridges, and with this invention, including the IBM 3590 style tape cartridge.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1A:
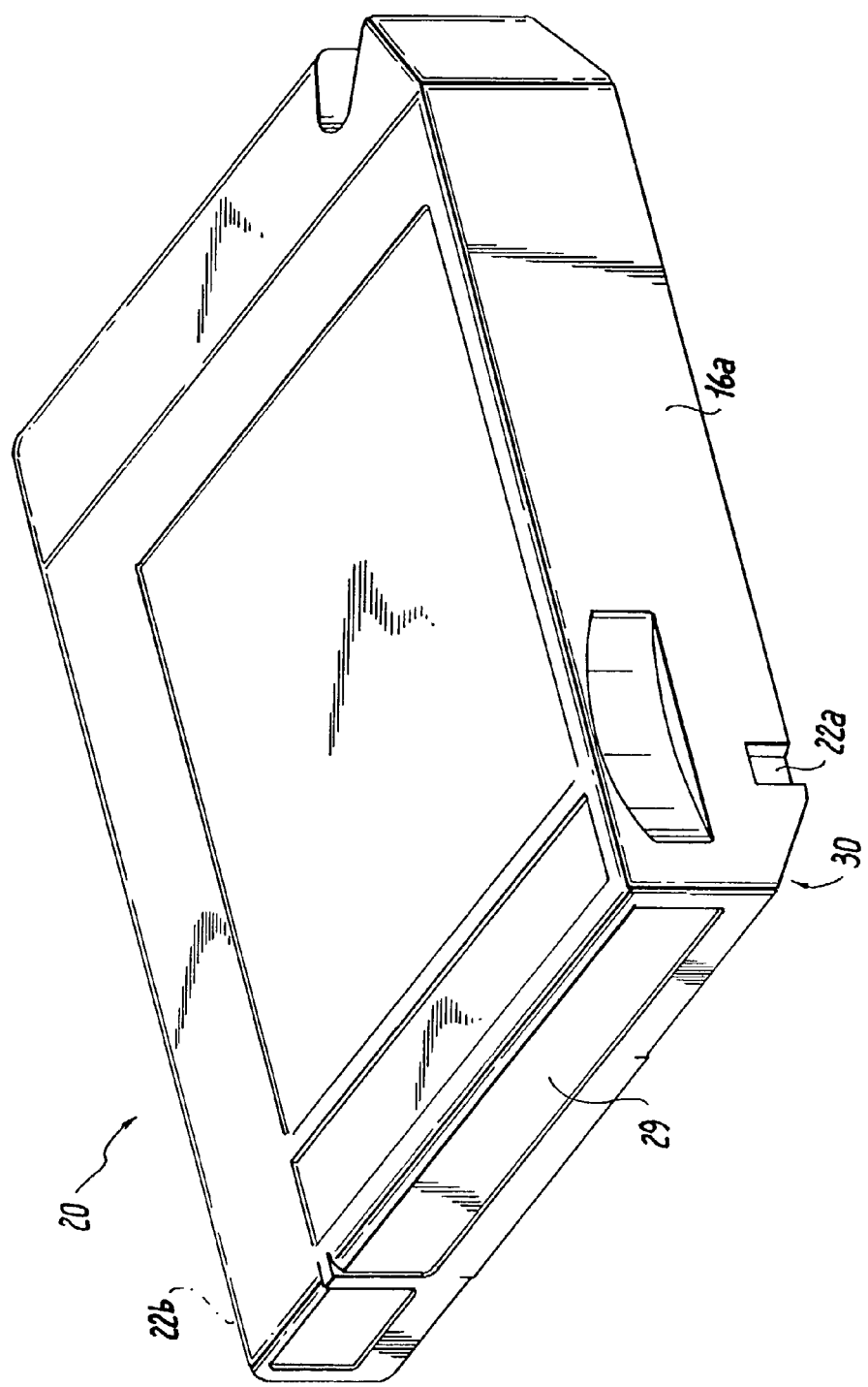
FIGS. 1(a) and 1(b) illustrate different perspective views of the IBM 3590 style cartridge 20 according to the prior art.
Figure 1B:
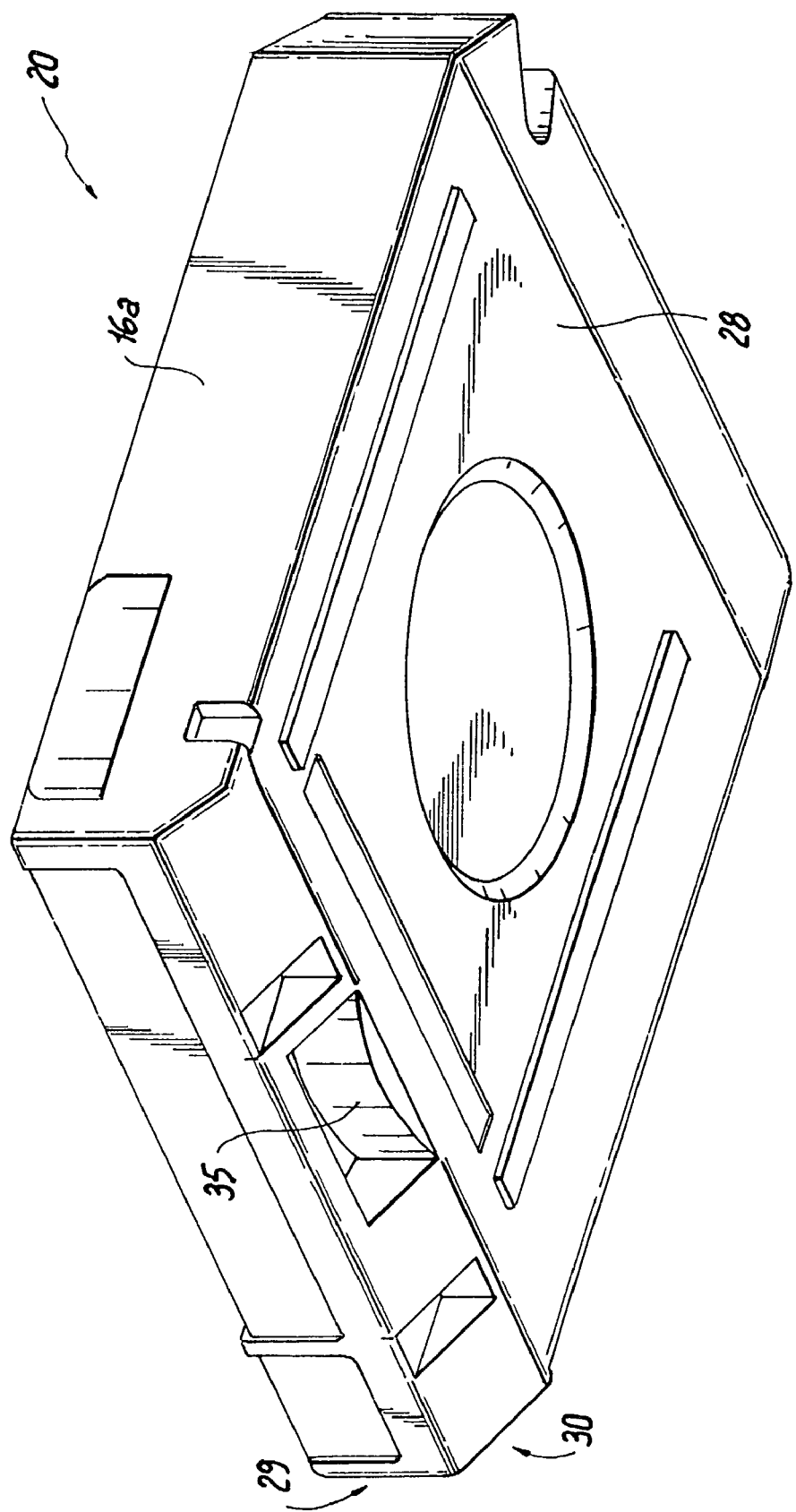
Figure 2:
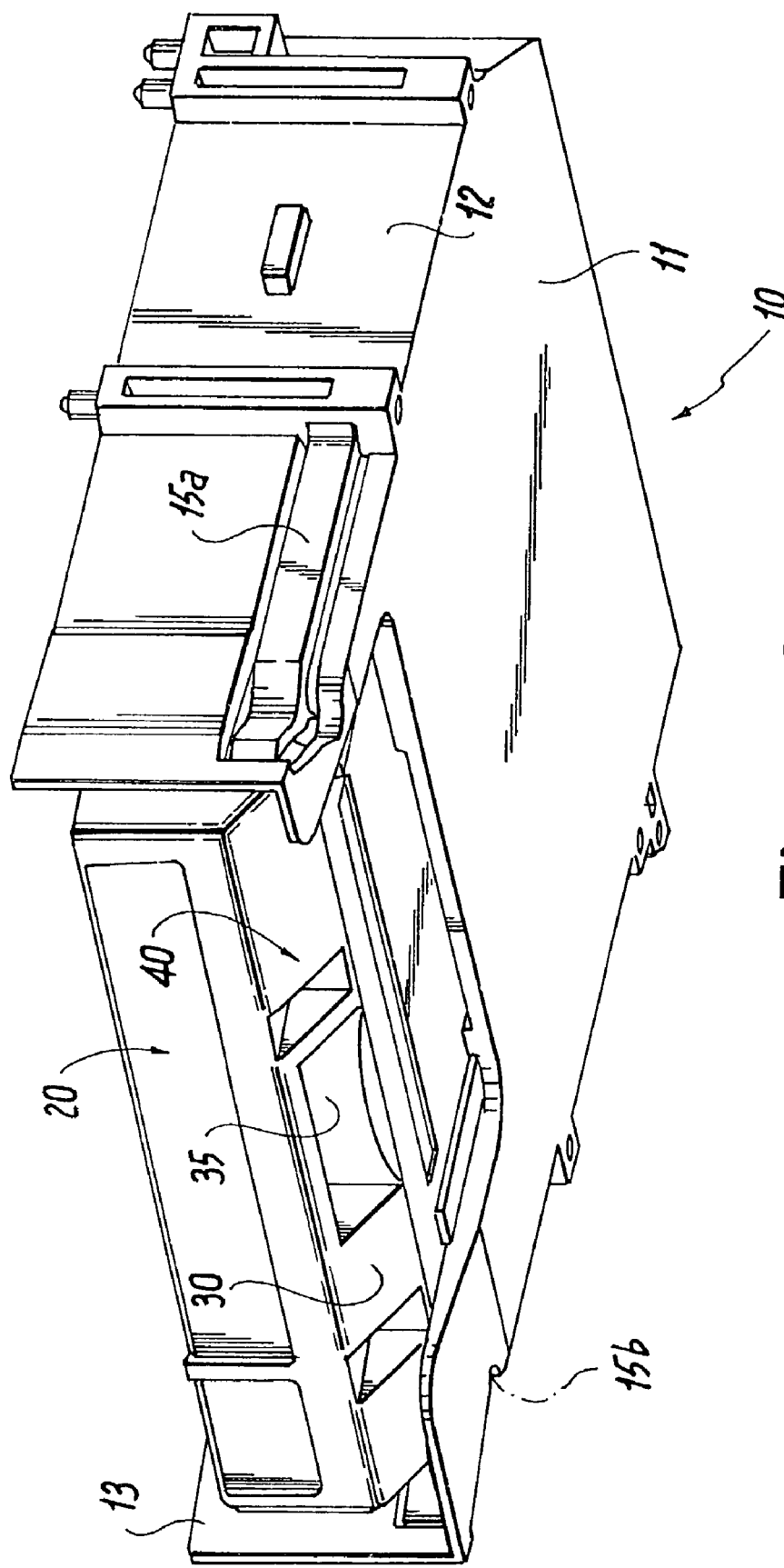
FIG. 2 illustrates a standard storage cell device 10, implemented in a tape library for receiving the IBM 3590 and like style tape cartridges 20 according to the prior art.
Figure 3:
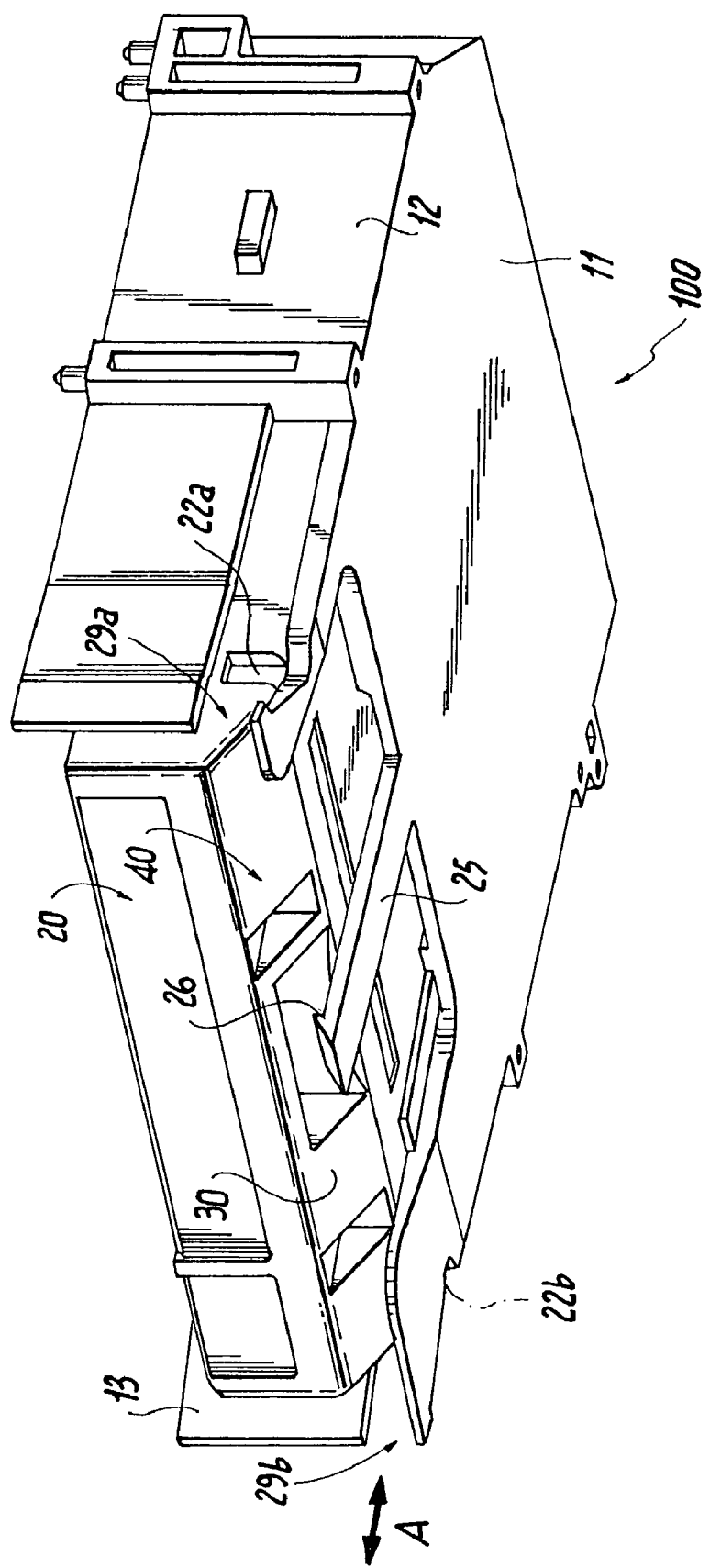
FIG. 3 illustrates a modified storage cell device 100 according to the invention, implemented in the IBM 3584 and like style tape library for accommodating the existing IBM 3590 and like style tape cartridges 20; and, FIG. 4 illustrates a novel gripper mechanism 50 according to the invention, for manipulating the modified IBM 3590 and like style tape cartridges 20 in the IBM 3584 tape library system.

FIG. 3 illustrates a modified tape cartridge cell 100 designed according to the invention. In the modified cell 100 of FIG. 3, the engagement sprung catches 15a,b of the prior art cell 10 shown in FIG. 2 are removed. As will be explained in greater detail, these engagement sprung catches 15a,b are removed to expose the respective slots 22a, 22b of the 3590 tape cartridge shown inserted within the modified storage cell 100 to enable gripper access to a tape cartridge when stored therein. The removal of catches 15a,b additionally provides respective cell access slots 29a,b so that a gripper mechanism when engaged with the cartridge may readily be extended or retracted for storage and retrieval operations. As further shown in the modified cell 100 illustrated in FIG. 3, the standard 3590 tape cartridge includes a sloped front portion 30 forming a lower edge. To facilitate fixing of the 3590 tape cartridge in the modified standard storage cell, the modified cell 100 is further designed to include a snap hook member or arm 25 extending outward from a bottom portion of the cell 100. The snap hook arm 25 includes an upward extending lip portion 26 designed to hold the 3590 tape cartridge in the standard storage cell 100. That is, the lip formed on a leading edge of the arm 25 functions to fixedly retain the cartridge in the cell by engaging the recessed portion 35 in the center of the cartridge.

Figure 4:
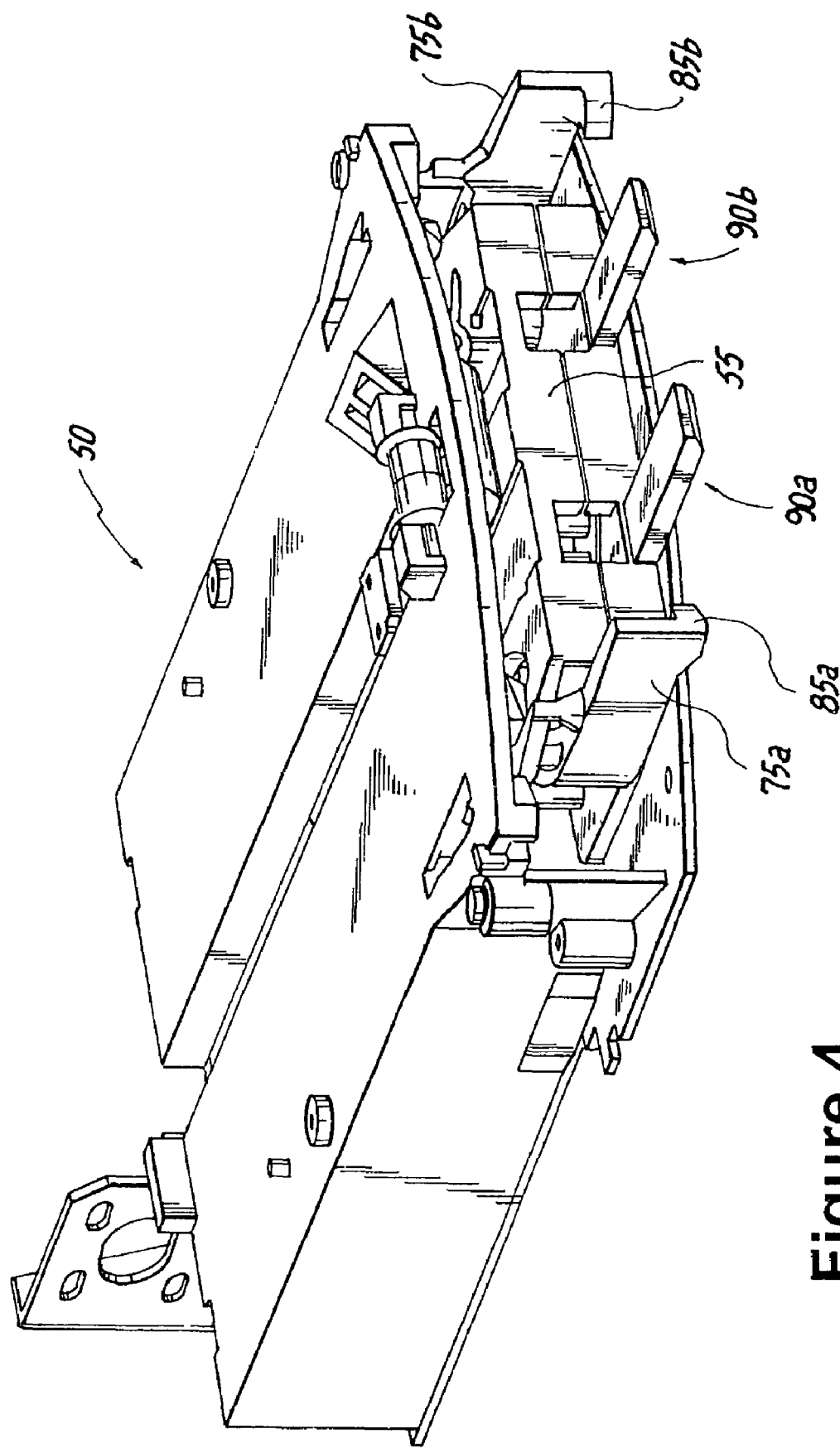

FIG. 4 illustrates the novel gripping mechanism 50 for the IBM 3584 tape library according to the invention. As shown in FIG. 4, the gripper device 50 includes an extensible gripping mechanism 55 having separately actuable standard side gripper engagement means 75a, 75b for gripping the existing LTO tape cartridges at the respective side slots 22a,b inherent in the cartridge 20. Particularly, the side gripper engagement fingers 75a, 75b include respective hooked portions 85a,b that are inwardly directed for engaging the respective side slots 22a,b inherent in the cartridge 20 when retrieving/inserting the tape from/to the cell 100 (FIG. 3).

According to the invention, the gripper device 50 is designed to include suitably wedge-shaped platform supports or ramp members 90a, b that extend outward from front of the extensible gripper mechanism 55 and are designed to mate with the sloped front lower edge portion 30. These ramp members 90a, b may be cantilevered or integrally formed to extend from the front of the gripper 55 in spaced apart fashion as shown in FIG. 4 for wedging the cartridge and lifting and supporting it in conjunction with the gripper operation. While two ramp members 90a,b are shown, it is understood that one larger ramp member or a plurality of ramp members may be equally implemented. Preferably, ramp members 90a, b are spaced apart in alignment with the ramped portion 30 of the 3590 style cartridge and are of a shape and strength suitable for wedge lifting and supporting the cartridge.

To grasp a cartridge, the gripper 55 is first indexed by suitable indexing means (not shown) for alignment with a cartridge located in a cell 100. Then, the gripper 55 is extended so that ramp members 90a, b located on the gripper mate with the sloped front lower edge portion 30 of the cartridge. The gripper is extended toward the cartridge, and by wedging action, lifts the cartridge. Then, the hooked portions 85a,b of respective gripper fingers 75a,b actuate under the force of springs (not shown) or like actuation mechanism (hydraulic, air, solenoid, for example), to engage the exposed slots 22a,b at the sides of the 3590 cartridge and grip the cartridge. The gripper mechanism 55 is then retracted so that the cartridge may be withdrawn from the cell 100. Particularly, as shown in FIG. 4, during gripper extension/retraction, the hooked portions 85a,b when engaged with the cartridge, easily move in/out of the cell 100 via respective access slots 29a,b in the direction indicated by arrow A. Preferably, for tape cartridge retrieval operations, in order for the gripper 50 to extract the cartridge from the cell 100, the cartridge is first lifted by the ramps 90a,b which wedge the cartridge at the sloped lower front edge portion 30 and lift the cartridge in an upward direction above the lip portion 26 on the leading edge of the cell.

Likewise, insertion of the cartridge back into the cell requires extending the gripper 55 toward the cell 100 in a manner for sliding the cartridge into the cell 100 while releasing the gripper fingers 75a,b. In one embodiment, the gripper may index the cartridge at an insertion height such that the force of gravity enables the lowering of the cartridge behind the cell lip when the gripper fingers 75a,b are withdrawn and the gripper mechanism 55 is retracted. In this embodiment, the gripper mechanism 50,55 is caused to move in a downward direction before retraction so as to ensure that the cartridge is behind the extended snap hook arm/lip 25, 26 and is not dragged out by the ramps 90a,b of the gripper 55. Otherwise, in an alternative embodiment, the gripper may index the cartridge at a lower insertion height so that the cartridge avoids sliding along the ramps 90a,b but rather slides along the bottom of the cell prior to relinquishing the gripping mechanism.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what I claim as new, and desire to secure by Letters Patent is:

1. A gripper mechanism for manipulating tape cartridges in a tape library system, said tape library system having a plurality of storage cells for removably storing a tape cartridge therein, each tape cartridge formed with engageable side slots located at side portions of the cartridge designed for retaining a respective cartridge in a respective storage cell and including a downward sloped lower front edge portion, said gripper mechanism having a pair of gripper fingers actuated for respectively engaging a respective side slot located at a side portion of the cartridge for manipulating said cartridge, and including support means extending outward from said gripper mechanism at a lower portion thereof for engagement with said sloped lower front edge portion, wherein said cartridge is lifted by said support means and grasped by said gripper fingers for storage and retrieval operations.

2. The gripper mechanism as claimed in claim 1, wherein for retrieval operations, said gripper is extended so that said support means engage said sloped lower front edge portion of the cartridge to enable movement of said cartridge in an upward direction prior to actuating gripper fingers for grasping said cartridge.

3. The gripper mechanism as claimed in claim 2, wherein said gripper fingers include respective inwardly directed hooked portions for engaging the respective side slots of said cartridge when actuated.

4. The mechanism as claimed in claim 2, wherein said support means comprises two ramp members extending outwards at a lower portion of said gripper mechanism, said ramp members enabling wedged engagement with said sloped lower front edge portion of said cartridge to enable said upward cartridge movement.

5. The gripper mechanism as claimed in claim 1, wherein said cartridge includes a recessed portion formed at said sloped lower front edge portion of said cartridge, a storage cell including a bottom portion having a retaining member extending outwardly therefrom, said retaining member including an upward extending lip portion for securing said tape cartridge within the storage cell at said recessed portion.

6. The gripper mechanism as claimed in claim 5, wherein for cartridge retrieval operations, said support means wedge said sloped lower front edge portion of said cartridge to lift said cartridge above said upwardly extending lip portion while in said cell prior to grasping and retrieval of said cartridge with said gripper fingers.

7. The gripper mechanism as claimed in claim 5, wherein for cartridge storage operations, said gripper mechanism is caused to be extended toward the cell for inserting said cartridge in said cell, said cartridge being lowered behind said upwardly extending lip portion prior to releasing said gripper fingers.

8. The gripper mechanism as claimed in claim 7, wherein for cartridge storage operations, said gripper mechanism is caused to be extended toward the cell at any height relative to a cell opening that is suitable for inserting the cartridge in said cell.

9. The gripper mechanism as claimed in claim 7, wherein said gripper mechanism is caused to be lowered in a downward direction before retracting said gripper mechanism to ensure that the cartridge is behind said upwardly extending lip portion.

10. The gripper mechanism as claimed in claim 1, wherein a storage cell includes respective access slots in substantial alignment with said engageable side slots located at side portions of the cartridge to enable gripper finger access to a tape cartridge when stored therein.

11. A tape library system comprising:
a plurality of storage cells each for removably storing a tape cartridge therein, a storage cell including a bottom portion having a retaining member extending outwardly therefrom, said retaining member including an upward extending lip portion for securing said tape cartridge within the storage cell;
a tape cartridge for storing data, each tape cartridge formed with a side slot located at a respective side portion of the cartridge, said side slots designed for retaining a respective cartridge in a respective storage cell, said tape cartridge further including a downward sloped lower front edge portion, and, a recessed portion at said sloped lower front edge portion of said cartridge, wherein said upwardly extending lip portion engages said recessed portion for limiting movement of said tape cartridge when inserted within the storage cell;
a gripper mechanism having a pair of gripper fingers actuated for respectively engaging a respective side slot located at a side portion of the cartridge for manipulating said cartridge, said gripper mechanism including ramp members extending outward from said gripper mechanism at a lower portion thereof for engagement with said sloped lower front edge portion; and,
means for extending said gripper mechanism toward and away from said storage cell for tape cartridge storage and retrieval operations,
wherein for a tape cartridge retrieval operation, said ramp members are actuated to lift said cartridge over said upwardly extending lip portion while in said cell prior to grasping said cartridge with said gripper fingers.

12. A tape library system comprising:
a plurality of storage cells each for removably storing a tape cartridge therein, a storage cell including a bottom portion having a retaining member extending outwardly therefrom, said retaining member including an upward extending lip portion for securing said tape cartridge within the storage cell;
a tape cartridge for storing data, each tape cartridge formed with a side slot located at a respective side portion of the cartridge, said side slots designed for retaining a respective cartridge in a respective storage cell, said tape cartridge further including a sloped lower front edge portion, and, a recessed portion formed at said lower front edge portion, wherein said upwardly extending lip portion engages said recessed portion for securing said tape cartridge within the storage cell;
a gripper mechanism having a pair of gripper fingers actuated for respectively engaging a respective side slot located at a side portion of the cartridge for manipulating said cartridge, said gripper mechanism including ramp members each extending outward from said gripper mechanism at a lower portion thereof for engagement with said sloped lower front edge portion, and,
means for extending said gripper mechanism toward and away from said storage cell for cartridge storage and retrieval operations,
wherein for cartridge storage operations when said gripper mechanism is grasping said tape cartridge at said respective side slots, said gripper mechanism is caused to be extended toward the storage cell for inserting said cartridge in said cell, said cartridge being lowered behind said upwardly extending lip portion prior to releasing said gripper fingers.

13. A method for manipulating tape cartridges in a tape library system, said tape library system having a plurality of storage cells for removably storing a tape cartridge therein, each tape cartridge formed with engageable side slots located at side portions of the cartridge designed for retaining a respective cartridge in a respective storage cell and including a downward sloped lower front edge portion, said method comprising:
a) engaging ramp members extending outward from a gripper device at a lower portion thereof with said sloped lower front edge portion of said cartridge;
b) actuating a pair of gripper fingers provided in said gripper device for engaging a respective side slot located at a side portion of the cartridge for grasping said cartridge, and,
c) lifting said cartridge by said ramp members while grasped by said gripper fingers for cartridge storage and retrieval operations.

14. The method as claimed in claim 13, wherein for cartridge retrieval operations, said step a) includes the step of: extending said gripper so that said ramp members engage said sloped lower front edge portion of the cartridge to enable movement of said cartridge in an upward direction prior to actuating gripper fingers for grasping said cartridge.

15. The method as claimed in claim 14, wherein said cartridge includes a recessed portion located at said sloped lower front edge portion, a storage cell including a bottom portion having a retaining member extending outwardly therefrom, said retaining member including an upward extending lip portion for securing said tape cartridge within the storage cell at said recessed portion, wherein for cartridge retrieval operations, said step a) including the step of: wedging said ramp members against said sloped lower front edge portion of said cartridge to lift said cartridge above said upwardly extending lip portion while in said cell prior to gasping said cartridge with said gripper fingers.

16. The method as claimed in claim 15, wherein for cartridge storage operations, said step a) includes the step of: extending said gripper device toward a storage cell for inserting said cartridge in said cell, and lowering said cartridge behind said upwardly extending lip portion prior to actuating said gripper fingers for releasing said cartridge.

17. The method as claimed in claim 16, wherein for cartridge storage operations, said method including extending said gripper device toward the cell at any height relative to a cell opening that is suitable for inserting the cartridge in said cell.

18. The method as claimed in claim 16, wherein for cartridge storage operations, said method further including the step of lowering said gripper device in a downward direction before retracting said gripper device to ensure that the cartridge is behind said upwardly extending lip portion.

* * * * *